UNITED STATES PATENT OFFICE.

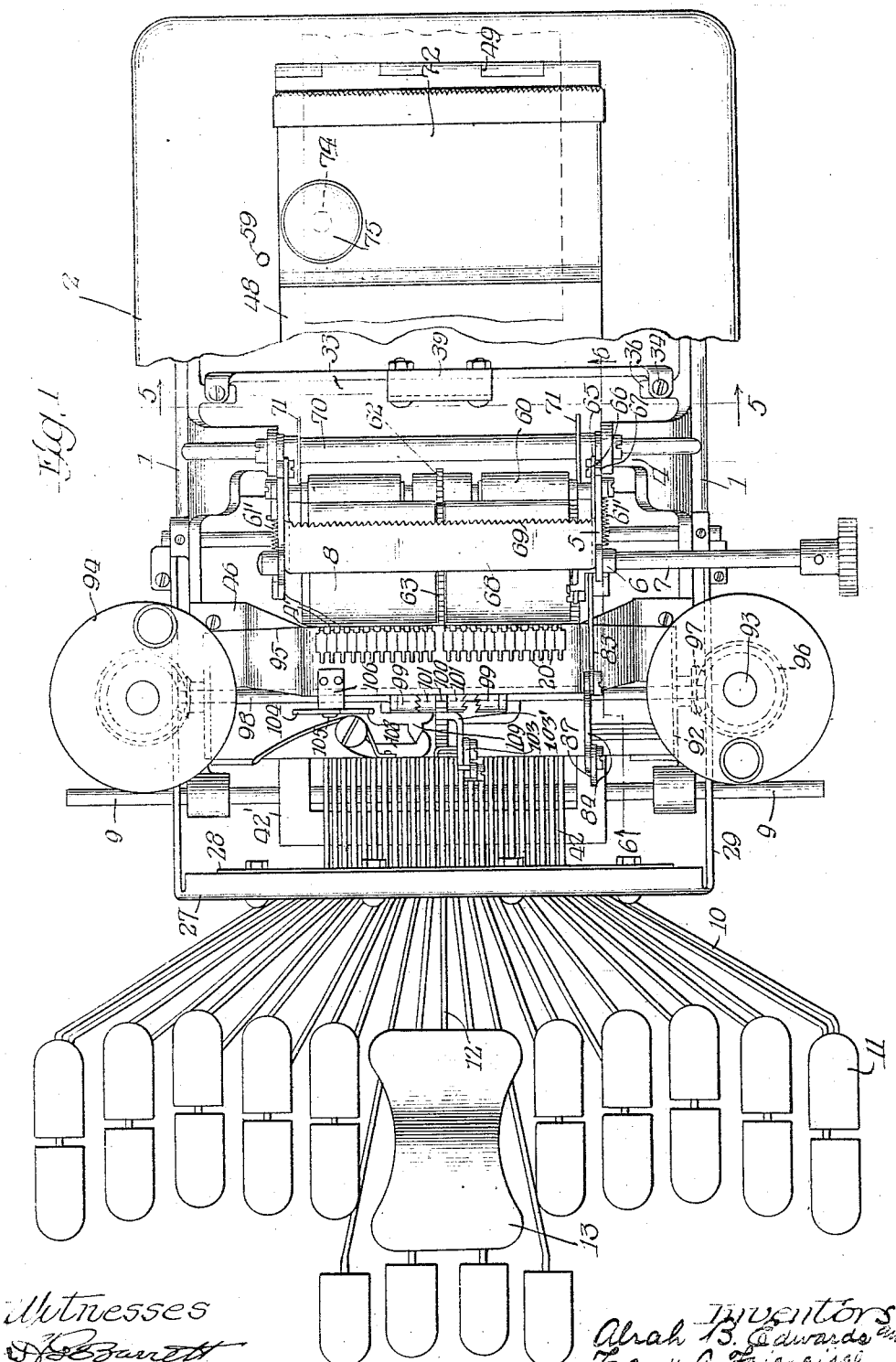

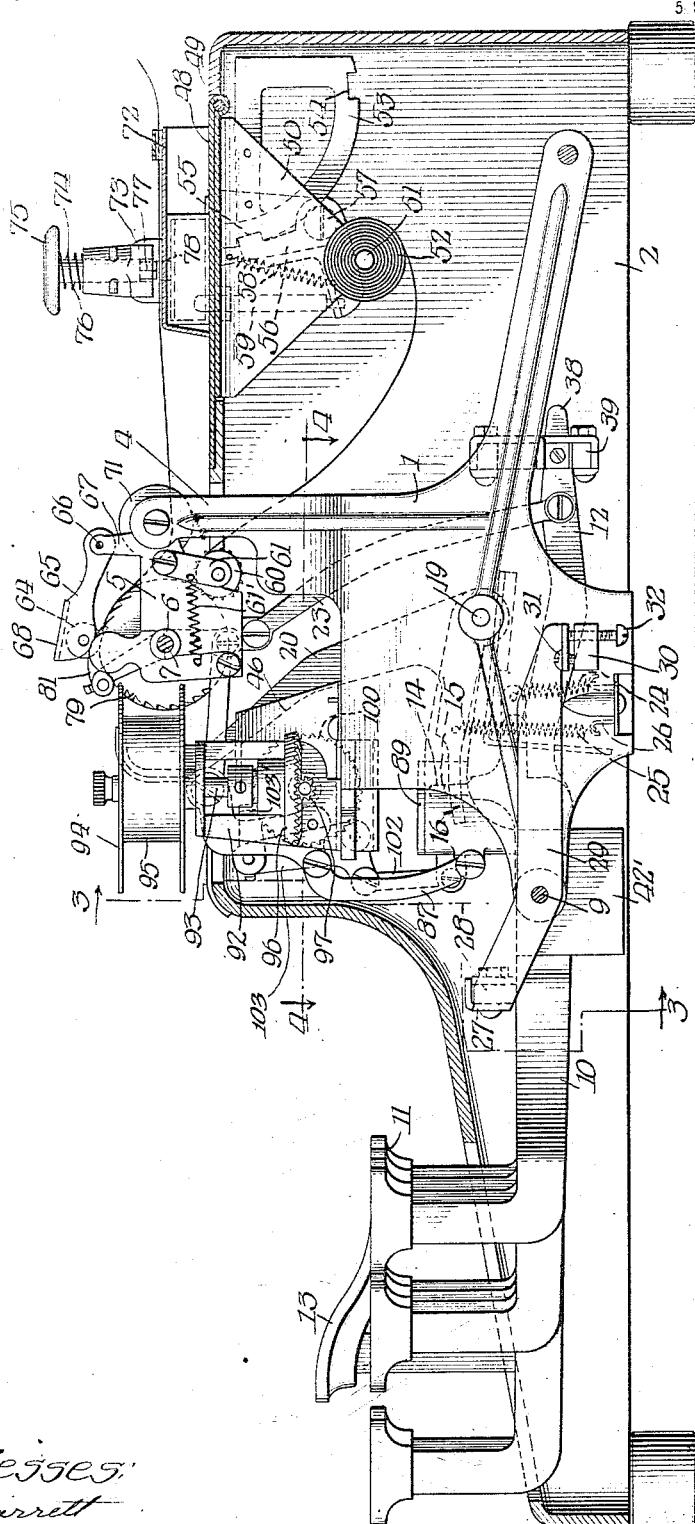

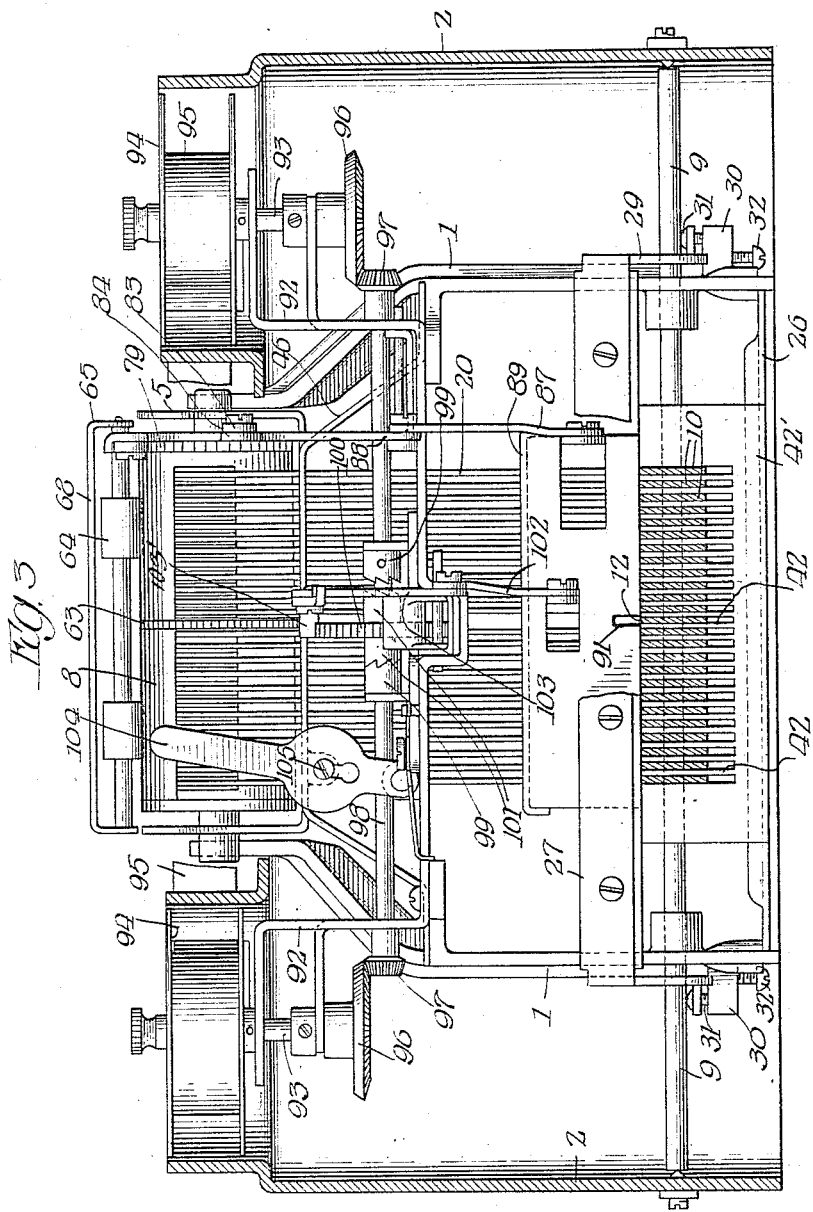

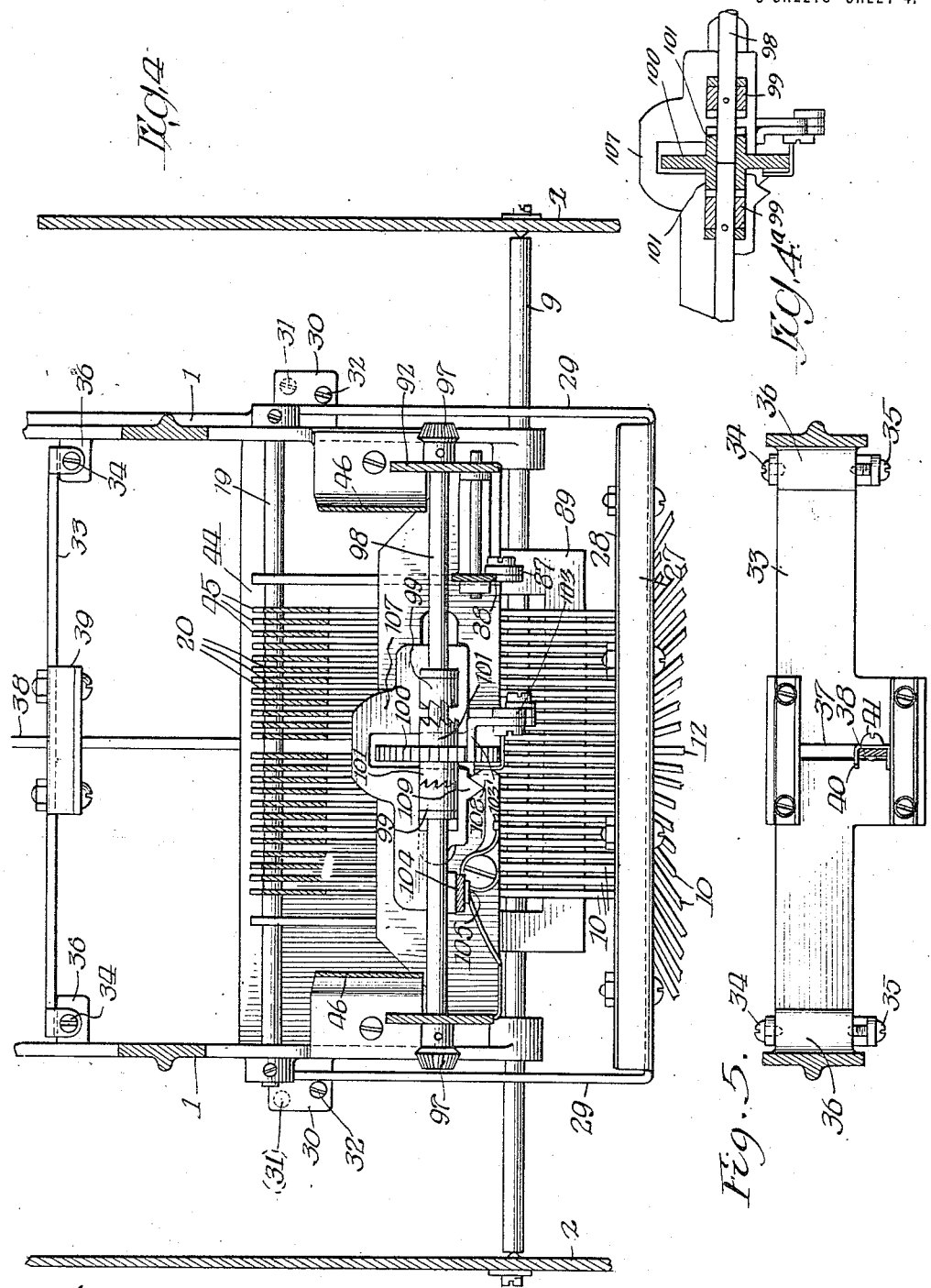

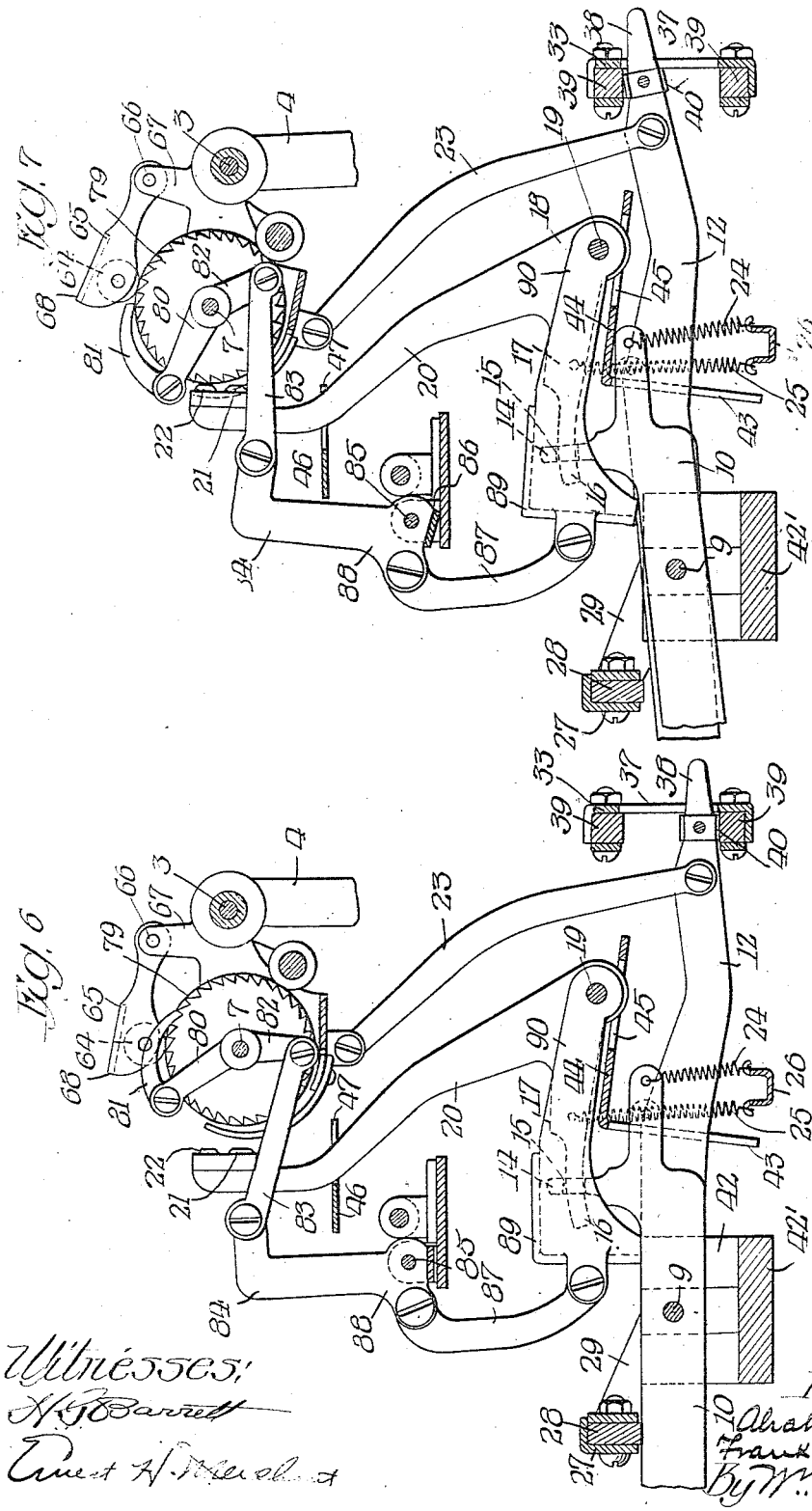

ALRAH B. EDWARDS AND FRANK A. FEIEREISEL, OF CHICAGO, ILLINOIS, ASSIGNORS TO SHORTWRITER COMPANY, OF WILMINGTON, DELAWARE, AND CHICAGO, ILLINOIS, A CORPORATION OF DELAWARE.

WRITING-MACHINE.

1,266,237.      Specification of Letters Patent.      Patented May 14, 1918.

Application filed March 17, 1916. Serial No. 84,822.

*To all whom it may concern:*

Be it known that we, ALRAH B. EDWARDS and FRANK A. FEIEREISEL, citizens of the United States, both residing at Chicago, in the county of Cook and State of Illinois, have jointly invented certain new and useful Improvements in Writing-Machines, of which the following is a specification.

This invention relates to writing machines and has for its principal object the provision in a writing machine having a platen and a plurality of key-actuated type bars of means for rotating the platen after an individual key or group of keys has been actuated.

A further object of our invention is the provision in a mechanism as above described of means for shifting the platen to coöperate with different groups of type characters carried by the respective type bars.

A further object of our invention is the provision in a writing machine having a platen, a plurality of key-actuated type bars and a shift-key bar operatively connected to the platen of means for rotating the platen through a definite angular distance when the shift-key bar is alone actuated and for rotating the platen through twice the angular distance when the shift-key bar is actuated simultaneously with an individual or group of type bars.

A further object of our invention is the provision in a writing machine of novel means for feeding the inking ribbon and for reversing the direction of movement of the feeding means.

A further object of our invention is the provision in a writing machine of means for insuring the positive feeding of the impression-receiving material over the platen.

A further object of our invention is the provision in a writing machine having a plurality of type bars, a platen movable relatively thereto and means for moving the platen of means for adjusting the platen-moving means to properly position the platen with respect to the type on the type bars.

A further object of our invention is the provision in a writing machine having a plurality of type bars and actuating means therefor of means for adjusting the actuating means to vary the range of movement of the type bars.

A further object of our invention is the provision in a writing machine of readily operable means to indicate on the impression-receiving material the position of changes and additions in the written text.

A still further object of our invention is the provision in a writing machine of simple and effective means for holding a supply of impression-receiving material and of means for positively feeding the material from said holding means.

Further objects and advantages of our invention will be apparent as it is better understood by reference to the following specification when read in connection with the accompanying drawing, illustrating a preferred embodiment thereof, in which—

Figure 1 is a plan view of the mechanism, the inclosing case being largely broken away for purposes of better illustration;

Fig. 2 is a vertical longitudinal section through the complete writing machine;

Fig. 3 is a vertical section on the line 3—3 of Fig. 2;

Fig. 4 is a horizontal section on the line 4—4 of Fig. 2;

Fig. 4ª is a detail in section illustrating the means for actuating the ribbon feed mechanism;

Fig. 5 is a vertical section on the line 5—5 of Fig. 1;

Fig. 6 is an enlarged vertical section on the line 6—6 of Fig. 1 illustrating the normal position of the parts, and Fig. 7 is a similar view illustrating the position of the parts when the shift key has been actuated simultaneously with one or more of the type keys.

Referring to the drawing 1 indicates a suitable frame adapted to support the various parts of the mechanism. The frame 1 is removably secured within a casing 2 which surrounds the mechanism preventing injury thereto and giving a pleasing appearance to the machine. Pivotally mounted on a rod 3 extending transversely of the machine between the upright members 4 of the frame 1 is a platen frame 5 which is provided at either end with suitable bearings 6 to receive the shaft 7 of the rotatable platen 8.

Pivotally mounted on a shaft 9 extending transversely of the frame 1 are a plurality of type key-bars 10 provided with keys 11 and a shift key-bar 12 provided with a shift key 13. The key-bars 10 are provided near their extremities with upwardly directed arms 14 having slots 15 therein adapted to receive the curved extensions 16 at the extremities of arms 17 of the bell-crank levers 18 pivotally mounted on a shaft 19 extending transversely of the frame 1. The upwardly directed arms 20 of the bell-crank levers 18 are each provided with two type characters 21 and 22, being preferably upper and lower case characters, respectively, and adapted to individually coöperate with the platen 8 depending upon its position.

The position of the platen 8 is controlled by the shift key 13, the shift key-bar 12 being connected near its extremity by a link 23 to the platen frame 5 so that when the shift key 13 is depressed the platen frame 5 will swing on its pivot from the position indicated in Fig. 6 to that indicated in Fig. 7. If the platen 8 is in the position indicated in Fig. 6 the type characters 21 coöperate therewith when the keys 11 are depressed and if the platen 8 is in the position indicated in Fig. 7 the type characters 22 coöperate therewith when the keys 11 are depressed, it being understood that when lower case characters 22 are to be printed the keys 11 and 13 are simultaneously actuated.

Springs 24 and 25, connected to a U-bar 26 secured transversely of the frame 1 and to the key-bars 10 and the arms 17 of the bell-crank lever, respectively, normally maintain the key-bars in the position indicated in Fig. 6. The range of movement of the key-bars 10 and hence of the type characters 21 and 22 is adjustable by means of a transverse member 27 preferably provided with sound-deadening material 28, such as felt, and secured to levers 29 pivoted on the shaft 9 at either side of the frame 1. The ends of the levers 29 are adjustably connected to lugs 30 on the frame 1 by screws 31 and 32. By adjusting the screws 31 and 32 the member 27 may be moved vertically to vary the upward limit of travel of the key-bars 10 and hence the movement of the type characters 21 and 22 in the direction away from the platen 8.

The shift key-bar 12 is returned to its normal position, indicated in Fig. 6, by the weight of the parts. The platen 8 is adjusted to assume the positions indicated in Figs. 6 and 7 by means of a transverse member 33 adjustably secured by screws 34 and 35 to lugs 36 on the frame 1. The member 33 is provided with a slot 37 to receive the end 38 of the shift key-bar 12 and is preferably provided with sound-deadening material 39 such as felt. A member 40 secured by a screw 41 to the end 38 of the shift key-bar 12 provides a relatively broad surface to engage the sound-deadening material 39. The type key-bars 10 and the shift key-bar 12 are maintained in proper alinement by tongues 42 on a transversely disposed member 42' engaging the key-bars 10 on either side of the shaft 9 and by the depending tongues 43 formed on a transversely disposed member 44 which is also provided with slots 45 to receive the extremities of the bell-crank levers 18. A transverse plate 46, secured to the frame 1 adjacent the printing characters 21 and 22 is provided with slots 47 in which the arms 20 of the bell-crank levers 18 operate. It will be apparent that by the arrangement described all lateral movement of the key and type bars is prevented and clear and distinct impressions are assured.

In writing machines of this character it is essential that impression-receiving material be constantly fed from a supply thereof over the platen in the path of the type characters. A plate 48 is pivotally mounted at 49 on the casing 2 rearwardly of the platen 8 and is provided with downwardly directed brackets 50 adapted to support a spindle 51 on which the roll 52 of impression-receiving material is disposed. A quadrant 53 is secured to one of the brackets 50 and is provided with a pair of notches 54 and 55 adapted to coöperate with the dog 56 pivotally mounted at 57 on the side of the casing 2 and biased by a spring 58 to engage the quadrant 53. A plunger rod 59 secured to the dog 56 and extending upwardly through the casing 2 enables the operator to withdraw the dog 56 from engagement with either of the notches 54 or 55, depending upon the position of the plate 48 so that the plate 48 may be moved to the desired position. When the dog 56 coöperates with the notch 55 the plate 48, and therefore the roll of impression-receiving material 52, is disposed in operative position as indicated in Fig. 2. The plate 48 may, however, be moved upwardly until the dog 56 engages the notch 54 in which position it will be locked with the roll 52 of impression-receiving material in position for inspection or replacement.

From the roll 52 the impression-receiving material passes over a friction roller 60 pivotally mounted in arms 61 depending from the platen frame 5 and held in engagement with the platen 8 by springs 61'. The friction roller 60 is provided midway of its length with a toothed wheel 62 which coöperates with a similarly toothed wheel 63 disposed midway of the platen 8. It will be noted that the bell-crank levers 18 are divided into two groups spaced apart midway of the platen 8 so that the type characters 21 and 22 do not engage the platen 8 at the central portion thereof. It will be apparent that the toothed wheels 62 and 63 will securely grip the impression-receiving material inasmuch as the toothed wheel 63 is disposed slightly beneath the surface of the platen 8 and that the impression-receiving material will, therefore, be positively fed about the platen as the latter is rotated. The impression-receiving material after passing about the platen 8, passes beneath a roller 64 rotatably mounted on arms 65 which are in turn pivotally mounted at 66 in the upwardly directed arms 67 of the platen frame 5. A plate 68, serrated at 69, provides means for readily severing the impression-receiving material when desired. From the roller 64 the impression-receiving material may pass beneath a guide roller 70 provided with flanges 71 and rotatably mounted on the shaft 3 and thence to a table 72 mounted on the plate 48 which supports the impression-receiving material so that notes or other memoranda may be made thereon in pencil if desired. A bracket 73 at one side of the table 72 slidably supports a plunger 74 having a head 75 which is normally pressed upwardly by a spring 76 surrounding the plunger 74. At its lower end the plunger 74 is provided with a punch 77 preferably in the form of an arrow which coöperates with a suitable opening 78 in the table 72 to punch the impression-receiving material adjacent the margin thereof and indicate to the reader that a correction printed thereafter is to be inserted at the point indicated by the arrow.

It is desirable that the platen 8 be rotated through a definite angular distance whenever an individual or group of key-bars 10 is actuated and that the platen 8 be rotated through the same angular distance whenever the shift key-bar 12 is actuated. It is also desirable that when the shift key-bar 12 is actuated simultaneously with an individual or group of key-bars 10 the platen 8 be rotated through twice the angular distance in order that the next character printed when the platen 8 returns to normal position shall not be disposed in the same line with the characters printed while the platen 8 is in the shift position. A ratchet wheel 79 is secured to the platen 8 at one end thereof and a bell-crank lever 80 is fulcrumed on the shaft 7 concentrically with the platen 8. A pawl 81 is pivotally secured to one arm of the bell-crank lever 80 and engages the teeth of the ratchet wheel 79. The other arm 82 of the bell-crank lever 80 is connected by a link 83 to one arm of a bell-crank lever 84 fulcrumed at 85 on a bracket 86 supported by the frame 1 of the machine. A link 87 connects an arm 88 of the bell-crank lever 84 to a universal bar 89 having arms 90 pivotally mounted on the shaft 19. The universal bar 89 rests upon the key-bars 10 but is slotted at 91 so as not to be engaged by the shift key-bar 12. Referring to Fig. 6, which illustrates the normal position of the parts, it will be apparent that when an individual or group of key-bars 10 is actuated the bell-crank lever 80 will, through its connection to the universal bar 89, be rotated with respect to the platen 8, withdrawing the pawl 81 a distance equal to the length of one of the teeth on the ratchet wheel 79. When the individual or group of key-bars is released and moved to normal position the pawl 81 will advance the ratchet wheel 79 and hence the platen 8 through a definite angular distance.

The means for swinging the platen 8 to accomplish the shift from upper to lower case characters 21 and 22 has already been described and upon further reference to Fig. 6 it will be apparent that if the shift key-bar 12 is alone actuated the platen 8 will swing but the universal bar 89, and consequently the bell-crank lever 84, will remain stationary. In this case one end of the link 83 is fixed and the link, therefore, forms a toggle which, as the platen 8 swings upwardly, causes the bell-crank lever 80 to rotate with respect to the platen an angular distance sufficient to withdraw the pawl 81 a distance equal to the length of one of the teeth on the ratchet wheel 79. When the shift key-bar 12 is released and returns to normal position the platen 8 will be rotated, as previously described. Referring to Fig. 7 it will be apparent that if the shift key-bar 12 is actuated simultaneously with an individual or group of key-bars 10 the resulting angular movement of the bell-crank lever 80 with respect to the platen 8 will be the sum of the two movements previously described and that hence the pawl 81 will be withdrawn a distance equal to the length of two teeth on the ratchet wheel 79 and when the shift key-bar 12 and the key-bars 10 are released the platen 8 will be rotated through a correspondingly greater angular distance.

Mounted on brackets 92 at either side of the frame 1 are spindles 93 supporting the ribbon spools 94 on which the inking ribbon 95 is wound. Bevel gears 96 are secured to the lower extremities of the spindles 93 and engage bevel pinions 97 on the shafts 98 supported in suitable bearings on the frame 1. Clutch members 99 are secured to the shafts 98 adjacent the contiguous ends thereof and a ratchet wheel 100, provided on either side with clutch members 101 adapted to coöperate with the clutch members 99, is loosely mounted on the shafts 98 between the clutch members 99. A member 102, secured to the universal bar 89, is connected at its upper extremity with one arm of a pivoted bell-crank lever 103 (Fig. 2), the other arm carrying a pawl 103' which coöperates with the ratchet wheel 100 to rotate the latter as the universal bar 89 reciprocates under the actuation of the key-bars 10. A finger lever 104 is pivotally mounted at 105 on a bracket 106 secured to the plate 46 and is connected at its lower end to a slidable plate 107 embracing the ratchet wheel 100 and adapted when actuated by the finger lever 104 to force the ratchet wheel 100 in either direction to engage one or the other of the clutch members 101 with the corresponding clutch member 99. A spring-pressed pawl 108 engages a projection 109 on the slidable member 107 and retains the member 107 in the position to which it is moved by the finger lever 104.

It will be apparent that the direction of movement of the ribbon 95 will depend upon which pair of clutch members 99 and 101 is engaged and that the direction of movement of the ribbon 95 may be shifted at will by manipulating the finger lever 104.

From the foregoing description it will be apparent that we have perfected a writing machine including numerous novel features of construction and operation and that various changes may be made in the form, construction and arrangement of the parts without departing from the spirit and scope of the invention or sacrificing any of its material advantages, the form hereinbefore described being merely a preferred embodiment thereof.

We claim:

1. In a writing machine, the combination of a rotatable platen, a plurality of printing devices, a plurality of key-bars actuating said printing devices to coöperate with said platen, and means for rotating said platen including a ratchet wheel operatively connected thereto, a lever fulcrumed concentrically with said platen, a pawl connected to said lever and engaging said ratchet wheel, a universal bar in the path of movement of said key-bars, a bell-crank lever pivotally mounted above said universal bar, and links connecting the arms of said bell-crank lever to said universal bar and lever respectively, whereby said pawl is withdrawn as said printing devices are moved to printing position and advanced as said printing devices return to normal position.

2. In a writing machine, the combination of a pivotally mounted platen frame, a rotatable platen carried thereby, a plurality of printing devices, each bearing a plurality of type faces, means for swinging said platen frame, whereby said platen is moved into the path of type faces normally out of register therewith, and means for rotating said platen including a ratchet wheel operatively connected thereto, a lever fulcrumed concentrically with said platen, a pawl connected to said lever and engaging said ratchet wheel, and means for rotating said lever as said platen frame swings.

3. In a writing machine, the combination of a pivotally mounted platen frame, a rotatable platen carried thereby, a plurality of printing devices each bearing a plurality of type faces, a shift key-bar operatively connected to said platen frame, whereby said platen is moved into the path of type faces normally out of register therewith, and means for rotating said platen including a ratchet wheel operatively connected thereto, a lever fulcrumed concentrically with said platen, a pawl connected to said lever and engaging said ratchet wheel, and means for rotating said lever as said platen frame swings.

4. In a writing machine, the combination of a rotatable platen, a plurality of printing devices, each bearing a plurality of printing characters, means for actuating said printing devices to coöperate with said platen, means for swinging said platen relatively to said printing devices, and means for rotating said platen including a lever fulcrumed concentrically with said platen, an intermittent driving connection between said lever and platen, and means actuated by said printing-device-actuating means for rotating said lever relatively to said platen.

5. In a writing machine, the combination of a rotatable platen, a plurality of printing devices each bearing a plurality of printing characters, means for actuating said printing devices to coöperate with said platen, a shift key-bar, and means operable thereby to swing said platen relatively to said printing devices, a ratchet wheel operatively connected to said platen, a lever fulcrumed concentrically with said platen, a pawl connected to said lever and engaging said ratchet wheel, and means operable by said printing-device-actuating means for rotating said lever relatively to said platen.

6. In a writing machine, the combination of a rotatable platen, a plurality of printing devices, each bearing a plurality of printing characters, a plurality of key-bars operatively connected to said printing devices, a shift key-bar, and means operable thereby to swing said platen relatively to said printing devices, a ratchet wheel operatively connected to said platen, a lever fulcrumed concentrically with said platen, a pawl connected to said lever and engaging said ratchet wheel, and means operable by said first-mentioned key-bars for rotating said lever relatively to said platen.

7. In a writing machine, the combination of a rotatable platen, a lever fulcrumed concentrically with said platen, an intermittent driving connection therebetween, means for swinging said platen, and a link, one end of which is pivotally mounted, the other end being connected to said lever whereby said lever is rotated relatively to said platen when the latter swings.

8. In a writing machine, the combination of a rotatable platen, a lever fulcrumed concentrically with said platen, a ratchet wheel operatively connected to said platen, a pawl connected to said lever and engaging said ratchet wheel, means for swinging said platen, and a link, one end of which is pivotally mounted, the other end being connected to said lever, whereby said lever is rotated relatively to said platen when the latter swings.

9. In a writing machine, the combination of a rotatable platen, a plurality of type bars, each bearing a plurality of type characters, means for actuating said type bars to coöperate with said platen, means for shifting said platen to coöperate with a group of type characters on said type bars normally out of register with said platen, and means for rotating said platen through a definite angular distance after an individual or group of said type bars is actuated and for rotating said platen through twice said angular distance after said shifting means is actuated simultaneously with an individual or group of said type bars.

10. In a writing machine, the combination of a rotatable platen, toothed means on said platen, means coöperating with said toothed means to grip the impression-receiving material, a plurality of type bars, each bearing a plurality of type characters, means for actuating said type bars to coöperate with said platen, means for shifting said platen to coöperate with a group of type characters on said type bars normally out of register with said platen, and means for rotating said platen through a definite angular distance after said shifting means is actuated and for rotating said platen through twice said angular distance after an individual or group of said type bars is actuated simultaneously with said shifting means.

11. In a writing machine, the combination of a casing, a plate hingedly secured to said casing, means secured to the under-side of said plate to support a roll of impression receiving material, a quadrant carried by said means and provided with a plurality of notches, a spring-pressed dog secured to said casing and adapted to selectively engage said notches, and manually operable means for releasing said dog from the notch engaged thereby.

12. In a writing machine, the combination of a frame, a plurality of pivoted key-bars, and normally rigid means for limiting the movement of said key-bars in one direction including a bar adapted to be engaged by said key-bars, pivoted arms supporting said bar, and means for adjusting the ends of said arms relatively to said frame, whereby said bar is vertically adjusted.

13. In a writing machine, the combination of a pivotally mounted platen frame, a key-bar extending from the front to the rear of the machine, a connecting link between said bar and frame, and vertically adjustable means at the rear of the machine in the path of said key-bar to limit the movement thereof.

14. In a writing machine, the combination of a machine frame, a pivotally mounted platen frame, a pivoted key-bar, a link connecting said key-bar and platen frame, lugs on said machine frame, a transverse member adjustably mounted on said lugs, and a slot in said member to receive the end of said key-bar.

ALRAH B. EDWARDS.
FRANK A. FEIEREISEL.

Witnesses:
M. A. KIDDIE,
ERNEST H. MERCHANT.